United States Patent
Wethington et al.

(10) Patent No.: US 9,039,432 B2
(45) Date of Patent: *May 26, 2015

(54) SYSTEM AND METHOD FOR HIGH CONNECTIVITY PLATFORM

(75) Inventors: Stephen T. Wethington, Sarasota, FL (US); Upen Reddy Kareti, Union City, CA (US); Gary L. Myers, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/543,468

(22) Filed: Jul. 6, 2012

(65) Prior Publication Data

US 2013/0010786 A1    Jan. 10, 2013

Related U.S. Application Data

(60) Provisional application No. 61/505,678, filed on Jul. 8, 2011.

(51) Int. Cl.
- *H01R 33/94* (2006.01)
- *H04L 12/46* (2006.01)
- *H04Q 1/02* (2006.01)
- *H04Q 1/04* (2006.01)

(52) U.S. Cl.
CPC ............ *H04L 12/4625* (2013.01); *H04Q 1/025* (2013.01); *H04Q 1/04* (2013.01); *H04Q 1/02* (2013.01); *H04Q 1/15* (2013.01)

(58) Field of Classification Search
CPC ........... H04Q 1/025; H04Q 1/04; H04Q 1/02; H04Q 1/15
See application file for complete search history.

(56) References Cited

U.S. PATENT DOCUMENTS

| | | | |
|---|---|---|---|
| 5,991,295 A | 11/1999 | Tout et al. | |
| 6,216,167 B1 | 4/2001 | Momirov | |
| 6,484,209 B1 | 11/2002 | Momirov | |
| 6,528,737 B1 * | 3/2003 | Kwong et al. | 174/262 |
| 6,603,771 B1 | 8/2003 | Raza | |
| 6,704,307 B1 * | 3/2004 | Graves et al. | 370/372 |
| 6,711,028 B2 * | 3/2004 | Iny | 361/788 |
| 6,876,652 B1 | 4/2005 | Bell et al. | |
| 7,031,330 B1 | 4/2006 | Bianchini, Jr. | |
| 7,039,046 B1 | 5/2006 | Simons et al. | |
| 7,280,356 B2 | 10/2007 | Pfahnl et al. | |
| 7,466,704 B2 | 12/2008 | Kalkunte et al. | |
| 7,885,066 B2 | 2/2011 | Boyden et al. | |
| 7,978,690 B2 | 7/2011 | Abel et al. | |
| 8,125,779 B2 | 2/2012 | Aybay et al. | |

(Continued)

OTHER PUBLICATIONS

Myers et al., U.S. Appl. No. 13/346,079 Patent Application "High Connectivty Platform,", filed Jan. 9, 2012.

*Primary Examiner* — Ajay Cattungal
(74) *Attorney, Agent, or Firm* — Baker Botts L.L.P.

(57) ABSTRACT

A system comprises a plurality of port cards arranged along a first orientation, the port cards operable to receive data from one or more nodes on a network. The system also comprises a plurality of switch-fabric cards arranged along a second orientation orthogonal to the first orientation, the switch-fabric cards operable to route data between the one or more port cards based on one or more rules. The system further comprises a plurality of bridge cards coupling the one or more port cards to the one or more switch-fabric cards, the bridge cards arranged physically between the port cards and switch-fabric cards.

18 Claims, 6 Drawing Sheets

(56) References Cited

U.S. PATENT DOCUMENTS

| | | |
|---|---|---|
| 8,154,867 B2 | 4/2012 | Shearman et al. |
| 8,545,246 B2 * | 10/2013 | Myers et al. ............... 439/247 |
| 2002/0099972 A1 * | 7/2002 | Walsh et al. ............... 714/10 |
| 2002/0162083 A1 * | 10/2002 | Fowler ............... 716/14 |
| 2002/0173869 A1 * | 11/2002 | Graafmans ............... 700/108 |
| 2004/0158667 A1 * | 8/2004 | Carr ............... 710/301 |
| 2007/0232089 A1 * | 10/2007 | Fung ............... 439/65 |
| 2008/0112133 A1 | 5/2008 | Torudbakken et al. |
| 2011/0056660 A1 | 3/2011 | Aybay et al. |
| 2012/0120596 A1 | 5/2012 | Bechtolsheim |
| 2013/0029532 A1 * | 1/2013 | Myers et al. ............... 439/638 |

\* cited by examiner

SYSTEM AND METHOD FOR HIGH CONNECTIVITY PLATFORM

CROSS-REFERENCE TO RELATED APPLICATION

This application claims priority under 35 U.S.C. §119(e) to U.S. Provisional Application Ser. No. 61/505,678 filed Jul. 8, 2011, entitled "System and Method for High Connectivity Platform," which is hereby incorporated by reference in its entirety.

TECHNICAL FIELD

The present disclosure relates generally to high connectivity platforms, and more specifically to high connectivity platforms with a three dimensional backplane.

BACKGROUND

Increasing channel density and/or data rates used by switching and/or routing platforms may result in a corresponding increase in both the number of switch fabric channels (e.g., Serializer/Deserializer or "SerDes" channels) and the operating frequency within the platform. This increase may make it more difficult to provide the desired connector density, signal integrity, and thermal cooling within the platform. One potential way to solve the connectivity problems is to increase the number of backplane routing layers used to connect the port cards with the switch-fabric cards, for example by increasing the amount of PCB layers in the backplane. However, the increased pin density of the backplane connectors may negate some of the routing improvements and cause signal integrity issues at higher frequencies due to the increased distance data has to travel to route around other connectors. In addition, thermal constraints, such as limited airflow for cooling, may be present in such architectures. Optimum front to rear airflow may not be achieved in part because there are limited open areas through which the air is able to flow. Moreover, the air that does flow to the switch-fabric cards in the rear of a platform may at least be partially pre-heated by the port cards in the front of the platform, or vice-versa. These thermal constraints may further limit the maximum component density on a card.

SUMMARY

A system comprises a plurality of port cards arranged along a first orientation, the port cards operable to receive data from one or more nodes on a network. The system also comprises a plurality of switch-fabric cards arranged along a second orientation orthogonal to the first orientation, the switch-fabric cards operable to route data between the one or more port cards based on one or more rules. The system further comprises a plurality of bridge cards coupling the one or more port cards to the one or more switch-fabric cards, the bridge cards arranged physically between the port cards and switch-fabric cards.

An alternative system comprises a plurality of port cards arranged along a first orientation, the port cards operable to receive data from one or more nodes on a network. The alternative system also comprises a plurality of switch-fabric cards arranged along a second orientation orthogonal to the first orientation, the switch-fabric cards operable to route data between the one or more port cards based on one or more rules. The alternative system further comprises a plurality of bridge cards coupling the one or more port cards to the one or more switch-fabric cards, the bridge cards having a first end and a second end, wherein a first portion of the port cards and a first portion of the switch-fabric cards couple to the bridge cards at the first end.

Embodiments of the present disclosure may provide numerous technical advantages. For example, certain embodiments of the present disclosure may allow for increased connectivity at a routing and/or switching platform in order to connect or couple one or more nodes on a network via the platform. As another example, certain embodiments of the present disclosure may allow for better air flow through the platform and over the cards for increased cooling capacity.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Embodiments of the present disclosure are best understood by referring to FIGS. 1 through 5 of the drawings, like numerals being used for like and corresponding parts of the various drawings.

Particular embodiments may comprise a routing or switching platform architecture (hereinafter simply "platform") that maximizes the number of port cards, maximizes the number of channel interconnections, minimizes channel lengths, maximizes the effectiveness of front to rear air flow for cooling, and minimizes mechanical issues.

Figure 1:
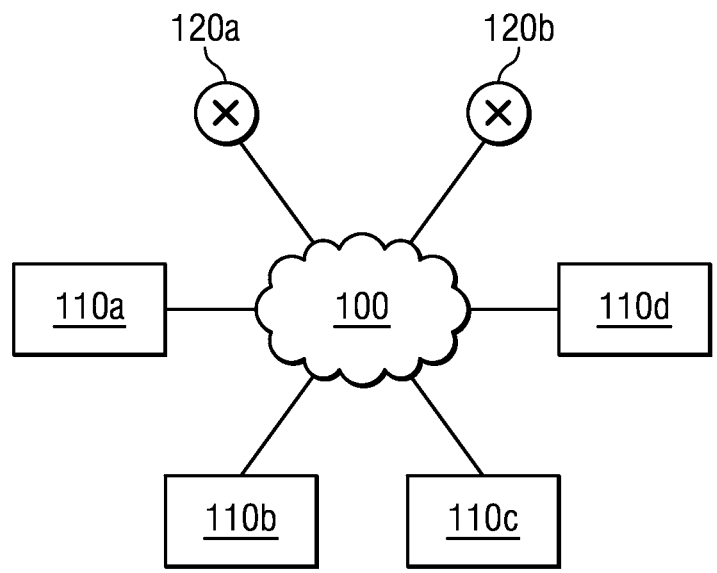
FIG. 1 illustrates a network in accordance with particular embodiments.

FIG. 1 illustrates a network 100 that includes one or more nodes 110 and one or more switching platforms 120 in accordance with particular embodiments. Network 100 may connect a plurality of nodes 110 and one or more switching platforms 120. Nodes 110 may include any combination of hardware and/or software embodied on a computer readable medium, and may comprise a computer. Switching platforms may include network components, such as routers, gateways, gatekeepers, hubs, switches, session border controllers, and/or any other additional hardware, software, or embedded logic implementing any number of communication protocols that allow for the exchange of packets between switching platforms and nodes connected to network 100. Network 100 may include any interconnecting system capable of transmitting audio, video, signals, data, messages, or any combination of the preceding. For example, network 100 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof.

Figure 2:
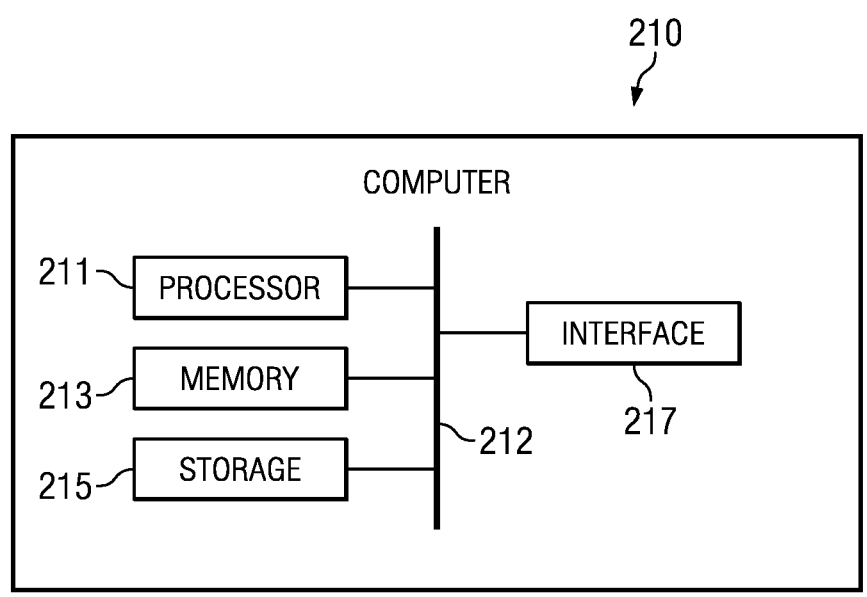
FIG. 2 illustrates a block diagram of a computer that may be used in accordance with particular embodiments.

FIG. 2 illustrates a block diagram of a computer that may be used in accordance with particular embodiments. Computer 210 may be a component of, or coupled to, one or more nodes, port cards, switch-fabric cards, or any other component of a switching platform. In particular embodiments, one or more of these computer systems may perform one or more steps of one or more methods. In particular embodiments, one or more computer systems may provide functionality described or illustrated herein. In particular embodiments, encoded software running on one or more computer systems may perform one or more steps of one or more methods or provide functionality described or illustrated herein.

The components of computer 210 may comprise any suitable physical form, configuration, number, type and/or layout. As an example, and not by way of limitation, computer 210 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer 210 may include one or more computer systems; be unitary or distributed; span multiple locations; span multiple machines; or reside in a cloud, which may include one or more cloud components in one or more networks.

Where appropriate, computer 210 may perform without substantial spatial or temporal limitation one or more steps of one or more methods. As an example, and not by way of limitation, computer 210 may perform in real time or in batch mode one or more steps of one or more methods. One or more computers may perform at different times or at different locations one or more steps of one or more methods, where appropriate.

In the depicted embodiment, each computer 210 may include its own respective processor 211, memory 213, storage 215, interface 217, and bus 212. These components may work together to provide routing or switching functionality. Although a particular computer is depicted having a particular number of particular components in a particular arrangement, this disclosure contemplates any suitable computer having any suitable number of any suitable components in any suitable arrangement. It is not necessary for each computer used within a platform to have the same components, or the same type of components.

Processor 211 may be a microprocessor, controller, application specific integrated circuit (ASIC), or any other suitable computing device, resource, or combination of hardware, software and/or encoded logic operable to provide, either alone or in conjunction with other components, (e.g., memory 213) routing or switching functionality. Such functionality may include providing various features discussed herein.

In particular embodiments, processor 211 may include hardware for executing instructions, such as those making up a computer program. As an example and not by way of limitation, to execute instructions, processor 211 may retrieve (or fetch) instructions from an internal register, an internal cache, memory 213 or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215 and the instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate. Memory 213 may store any suitable data or information utilized by computer 210, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. In particular embodiments, one or more memory management units (MMUs) may reside between processor 211 and memory 213 and facilitate accesses to memory 213 requested by processor 211.

As an example and not by way of limitation, computer 210 may load instructions from storage 215 or another source (such as, for example, another computer system, another platform, or another device coupled to computer 210) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

In particular embodiments, storage 215 may include mass storage for data or instructions. As an example and not by way of limitation, storage 215 may include a hard disk drive (HDD), a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to computer 210 (and/or remote transceiver 220), where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 (and/or 227) may include hardware, encoded software, or both providing one or more interfaces for communication (such as, for example, packet-based communication) between computer 210, port cards, switch-fabric cards, bridge cards, any networks, any network devices, and/or any other computer systems. As an example, and not by way of limitation, interface 217 may include a network interface controller (NIC) or network adapter for communicating with an Ethernet or other wire-based network and/or a wireless NIC (WNIC) or wireless adapter for communicating with a wireless network. Interface 217 may include one or more connectors for communicating traffic (e.g., IP packets) via a bridge card.

Depending on the embodiment, interface 217 may be any type of interface suitable for any type of network in which computer 210 is used. As an example and not by way of limitation, distributed antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. Computer 210 may include any suitable interface 217 for any one or more of these networks, where appropriate.

In some embodiments, interface 217 may include one or more interfaces for one or more I/O devices. One or more of these I/O devices may enable communication between a person and computer 210. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 211 to drive one or more of these I/O devices. Interface 117 may include one or more interfaces 117 where appropriate.

Bus 212 may include any combination of hardware, software embedded in a computer readable medium, and/or encoded logic incorporated in hardware or otherwise stored (e.g., firmware) to couple components of computer 210 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3A:
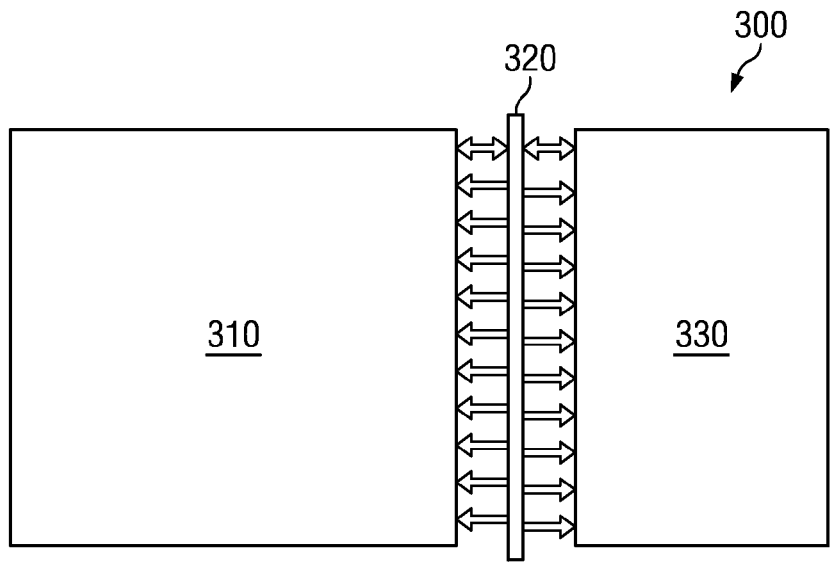
FIGS. 3A and 3B illustrate a top view and side view of an enclosure incorporating a two-dimensional backplane.
Figure 3B:
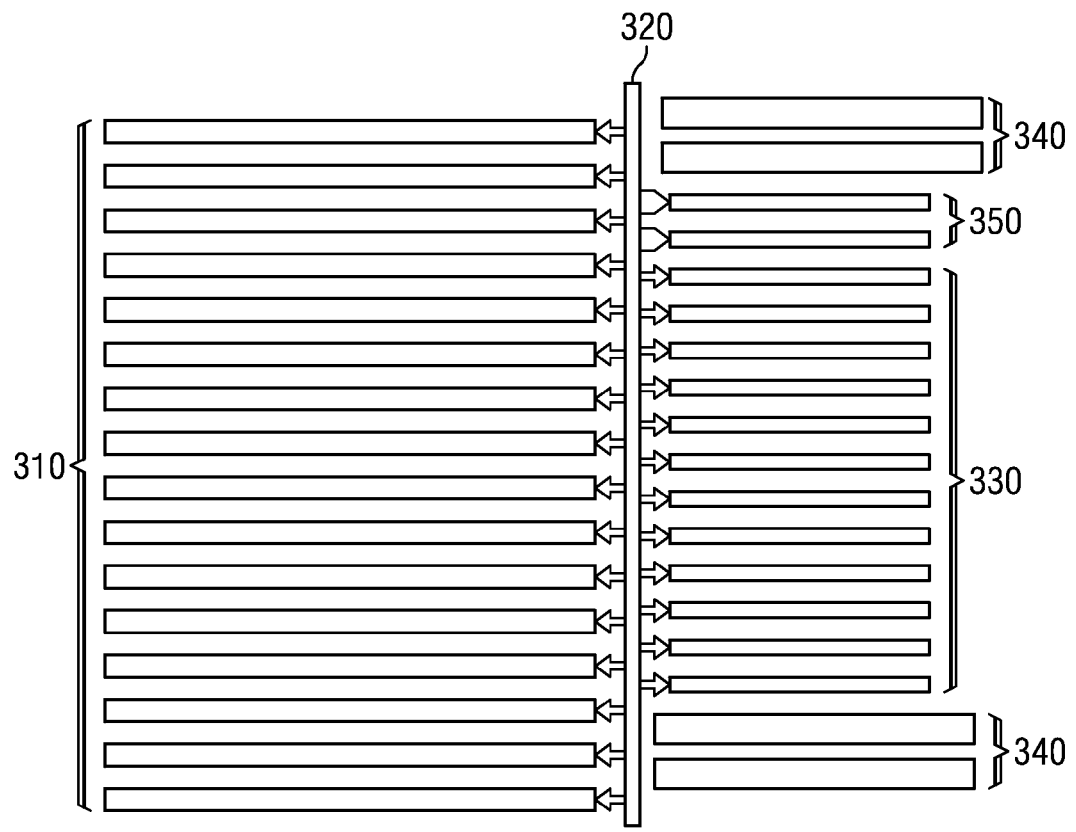

FIGS. 3A and 3B illustrate a top view and side view, respectively, of an enclosure incorporating a two-dimensional backplane and may be embodied in current platform architectures. Within platform 300, port cards 310 may be arranged on a first side of backplane 320, while switch-fabric cards may be arranged on a second side of backplane 320 opposite the first side. The port cards 310 and the switch-fabric cards may be arranged in any suitable way with respect to the backplane 320. Port cards 310 may be operable to receive data from nodes 110 on network 100 in such a platform. Backplane 320 may be operable to couple port cards 310 to switch-fabric cards 330 through one or more electrical connections, such as through printed circuit board (PCB) layers or any other suitable electrical connection. Switch-fabric cards may be operable to receive data from a first port card and route the data to one or more port cards 310 according to one or more routing rules so that port cards 310 may then transmit the data to one or more nodes 110 on network 100. Some embodiments may include one or more power modules 340 operable to provide power to the one or more components of platform 300, while certain embodiments may additionally include one or more supervisor cards 350 operable to monitor one or more components of platform 300.

In platforms such as those illustrated in FIGS. 3A and 3B, thermal efficiency may be a problem due to limited air flow. For example, front to rear airflow cannot be achieved in part because there are limited open areas through which the air is able to flow, i.e. air flowing past the port cards 310 will be mostly obstructed by backplane 320. In addition, the air that does flow past backplane 320 to switch-fabric cards 330 is at least partially pre-heated by the port cards 310.

Moreover, the number of connections to nodes 110 via port cards 310 may be limited due to mechanical constraints or challenges. For example, the increasing channel density and data rates used by switching and/or routing platforms has resulted in a corresponding increase in both the number of switch fabric channels (e.g., Serializer/Deserializer or "SerDes" channels) and the operating frequency within the platform. Such an increase may make it more difficult to provide the desired connector density, signal integrity, and thermal cooling within the platform. One potential way to solve the connectivity problems is to increase the number of backplane routing layers used to connect the port cards 310 with the switch-fabric cards 330, for example by increasing the amount of PCB layers in the backplane 320. However, the increased pin density of the backplane connectors may negate some of the routing improvements and cause signal integrity issues at higher frequencies due to the increased distance data has to travel to route around other connectors.

To mitigate such issues with routing in a backplane, some platforms may be designed such that the cards are directly connected together orthogonally to each other. For instance, port cards 310 may be directly coupled to a switch-fabric card 330 such that the switch-fabric card 330 is arranged similar to backplane 320 in FIGS. 3A and 3B. The direct connection between the cards avoids routing in the backplane, but may limit the number of port cards that can be used based on the size that a board such as a printed circuit board (PCB) can be manufactured for the switch-fabric cards. The orthogonal architecture also has similar thermal constraints as above due to the limited airflow for cooling. Optimum front to rear airflow cannot be achieved as air flowing past the port cards 310 will be mostly obstructed by switch-fabric cards 330. In addition, the air that does flow to the switch-fabric cards 330 is at least partially pre-heated by the port cards 310, or vice-versa. This thermal constraint may further limit the maximum component density on a card.

Figure 4A:
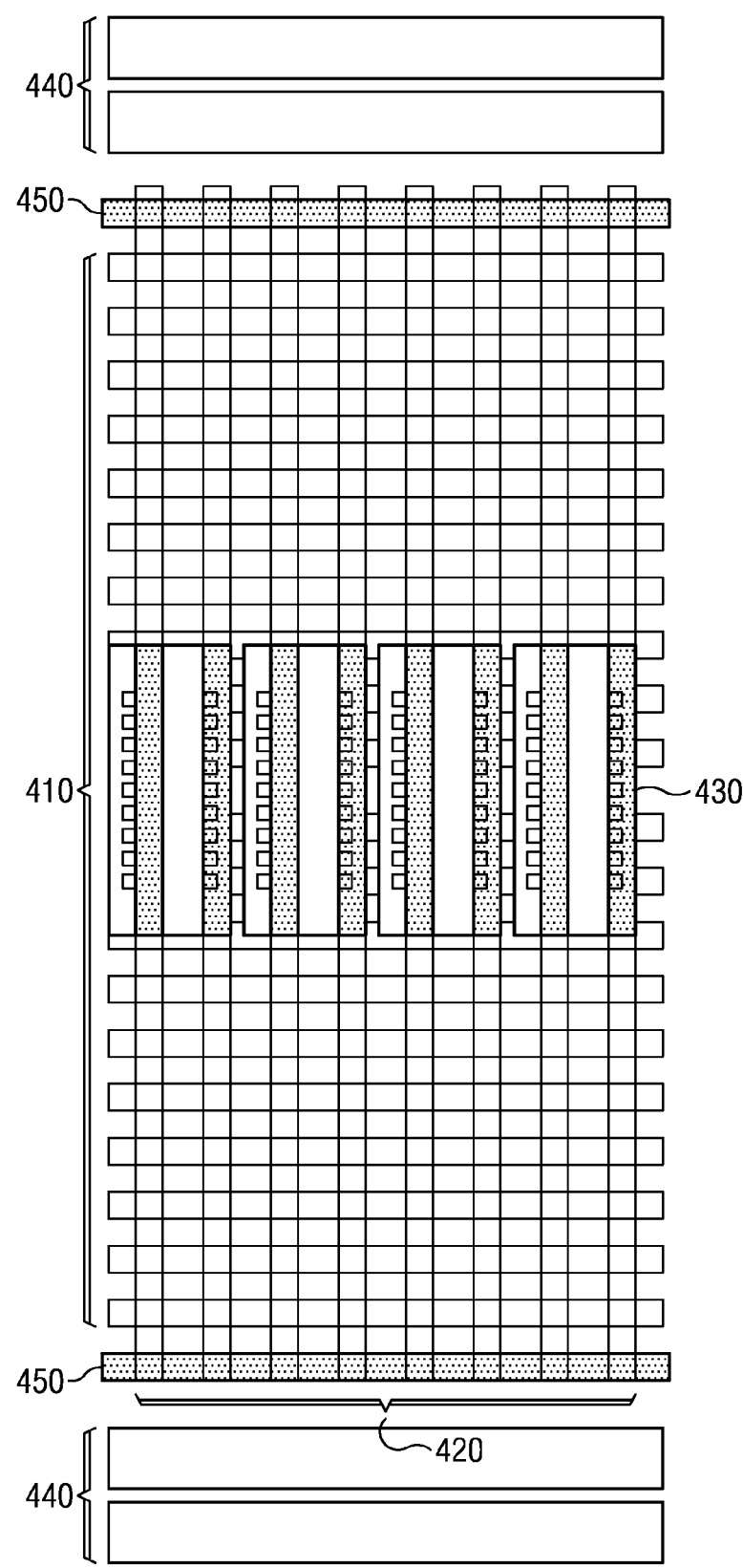
FIGS. 4A and 4B illustrate a front view and a side view of an enclosure in which a plurality of port cards are coupled to a plurality of switch-fabric cards via a plurality of bridge cards, in accordance with particular embodiments.
Figure 4B:
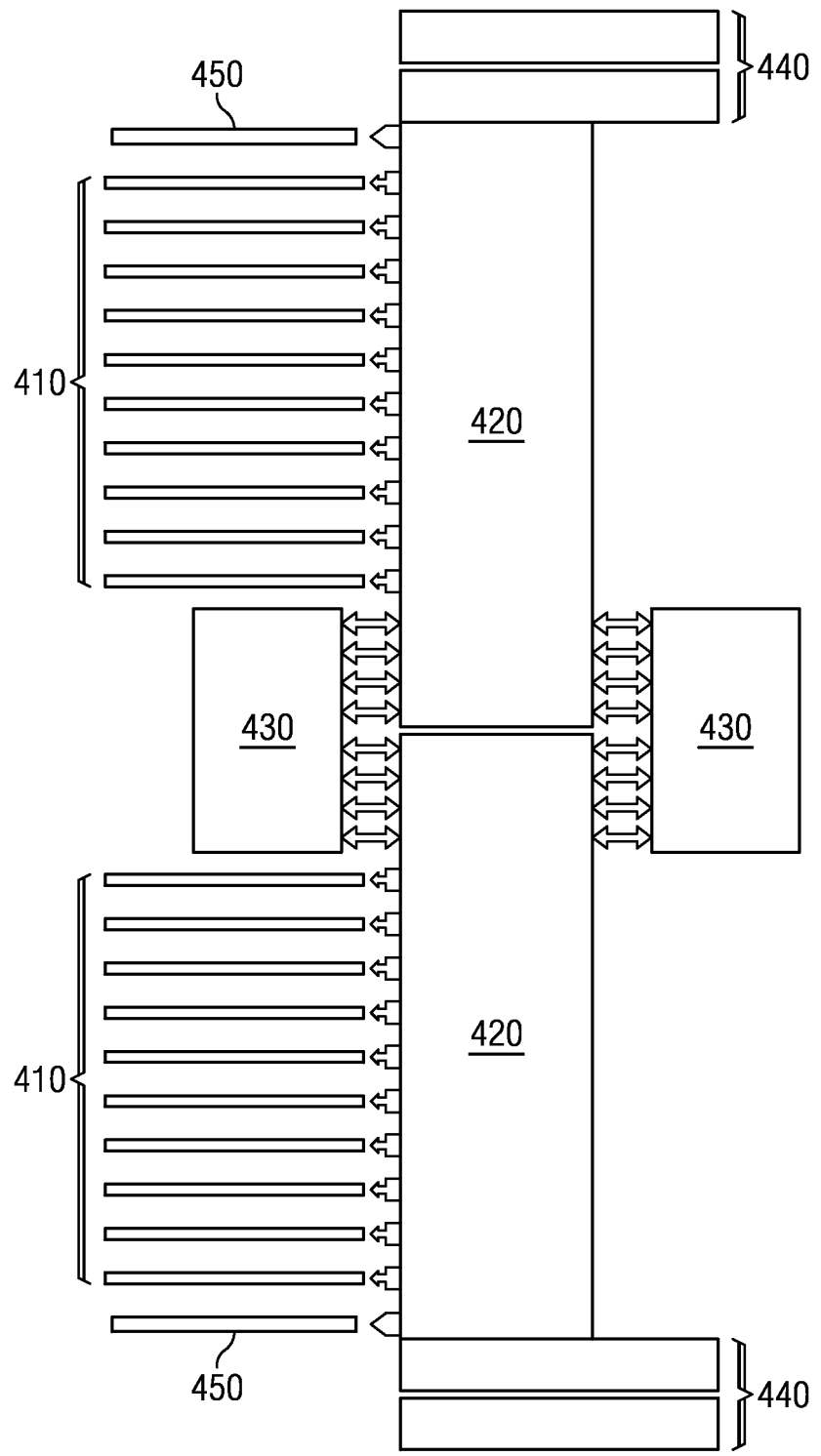

FIGS. 4A and 4B depict a front view and a side view, respectively, of a block diagram of a platform, in accordance with particular embodiments. Within platform 400, port cards 410 may be arranged orthogonally to switch-fabric cards 430. This may allow one set of cards, such as port cards 410, to be mounted horizontally within platform 400 and the other set of cards, such as switch-fabric cards 430, to be mounted vertically within platform 400. As can be seen in FIG. 4B, at least a portion of port cards 410 and a portion of switch-fabric cards 430 may be located at the front of platform 400. In addition, at least a portion of switch-fabric cards 430 may be located at the rear of platform 400. Although not pictured in FIG. 4B, at least a portion of port cards 410 may be located at the rear of platform 400. Some embodiments may also include one or more power modules 440 operable to provide power to the one or more components of platform 400, while certain embodiments may additionally include one or more supervisor cards 450 operable to monitor one or more components of platform 400 (e.g. port cards 310, bridge cards 320, and/or switch-fabric cards 330).

Bridge cards 420 may couple and/or interconnect port cards 410 and switch-fabric cards 430. Bridge cards 420 may effectively create a three dimensional midplane or backplane. In some embodiments, bridge cards 420 may be aligned with switch-fabric cards 430. In such embodiments, each bridge card 420 may be associated with any number of port cards 110 but only one switch-fabric card 430.

In certain embodiments, unlike current platform architectures where in order to increase interconnect resources you need to add PCB routing layers, bridge card 420 may provide for increases in interconnect resources by increasing PCB layers and/or by increasing the depth (as view from front of platform) of bridge cards 420. For a traditional midplane or backplane, as the depth increases, so to does the technological difficulty and/or financial costs such that there is a limit to the depth that can practically be achieved. This, in turn, limits that amount of connectivity a platform may provide to nodes 110 in network 100.

In certain embodiments, bridge cards 420 may be fixed within platform 400. This may help to minimize and/or eliminate mechanical registration issues (in a traditional orthogonal architecture there are multiple connectors on the port cards and the switch-fabric cards that must mate when the cards are installed, as you increase the number and/or the size of the cards in a platform alignment for mating of connectors are harder to achieve). In particular embodiments, the switch fabric channels of platform 400 may be partitioned into N fabric domains. In such an embodiment, each switch-fabric card 430 may provide services for a subset of the fabric domains. Connectivity between port cards 410 for a subset of fabric domains may be provided by bridge cards 420. Fabric inter-domain connectivity may be performed within port cards 410.

In certain embodiments, bridge cards 420 may be aligned with the direction of airflow (front to rear) and may maximize the openings for airflow through platform 400. Air can flow freely through the space between individual bridge cards 420. In some embodiments, bridge cards 420 may be physically shaped and placed so as to improve the flow of air through platform 400.

In some embodiments, platform 400 may comprise active cards between port and switch-fabric cards, split bridge cards, and/or segmented bridge cards. In particular embodiments, platform 400 may comprise an architecture that provides a high number of channel interconnects between removable cards through, in part, the use of fixed interconnect bridge cards 420. Bridge cards 420 may be used to effectively create a three dimensional interconnect architecture that maximizes the openings for airflow in platform 400. In particular embodiments, bridge cards 420 may allow platform 400 to have both port cards and switch-fabric cards installed in the front end of an enclosure. This may allow both sets of cards to received fresh air (e.g., air that is not preheated by other cards). The improved cooling, and improved air flow, may allow platform 400 to accommodate front and/or switch-fabric cards with a higher thermal density.

Depending on the scenario and/or operational needs, bridge cards 420 may include cables within a shaped housing or case, a PCB, or any other configuration. The housing, case or PCB may be shaped to connect the various front and switch-fabric cards as well as to improve the flow of air through an enclosure housing the cards. In certain embodiments, the cables within the case or housing may comprise fiber optic cables, twin ax cables, coax cables, twisted pair cables, or any other suitable cabling that may allow bridge cards 420 to maximize the possible number of interconnects, operate at higher channel frequencies, and improve signal integrity. Bridge cards 420 may simplify the routing on port cards 110 and/or switch-fabric cards 430, reduce PCB layer counts, optimize and organize interconnect for the fabric channels which can help routing on the front and switch-fabric cards.

Figure 5A:
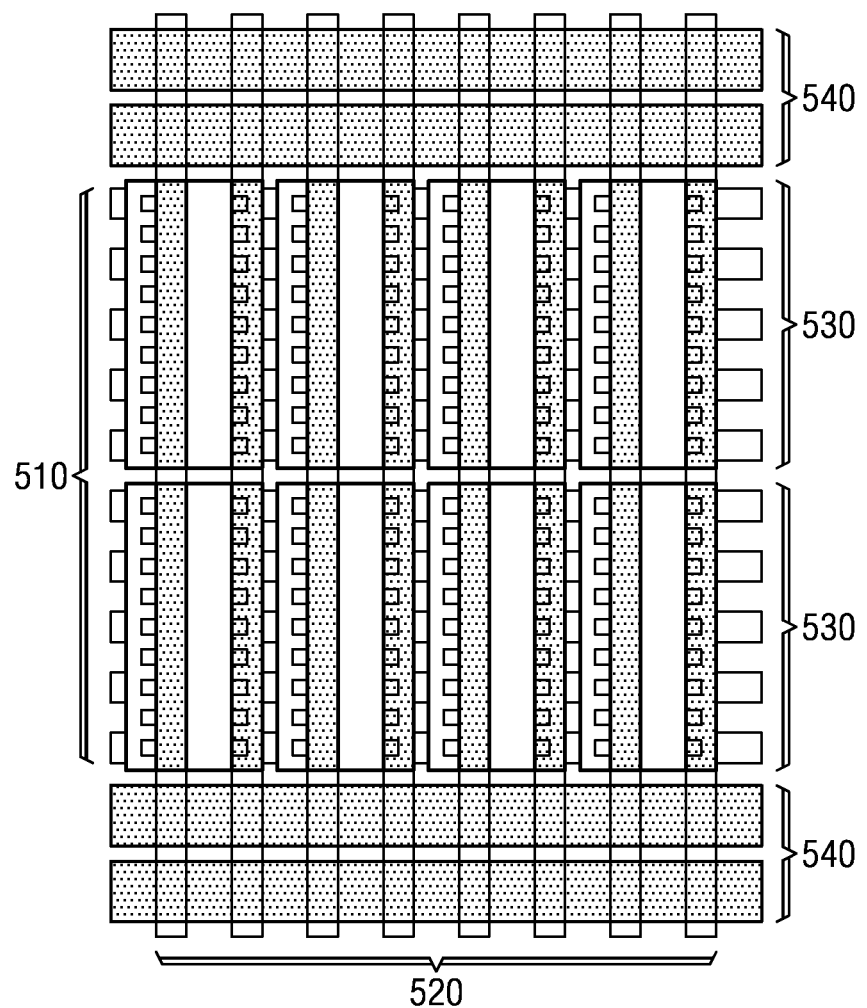
FIGS. 5A and 5B illustrate a back view and a side view of an alternative embodiment which a plurality of port cards are coupled to a plurality of switch-fabric cards via a plurality of bridge cards, in accordance with particular embodiments.
Figure 5B:
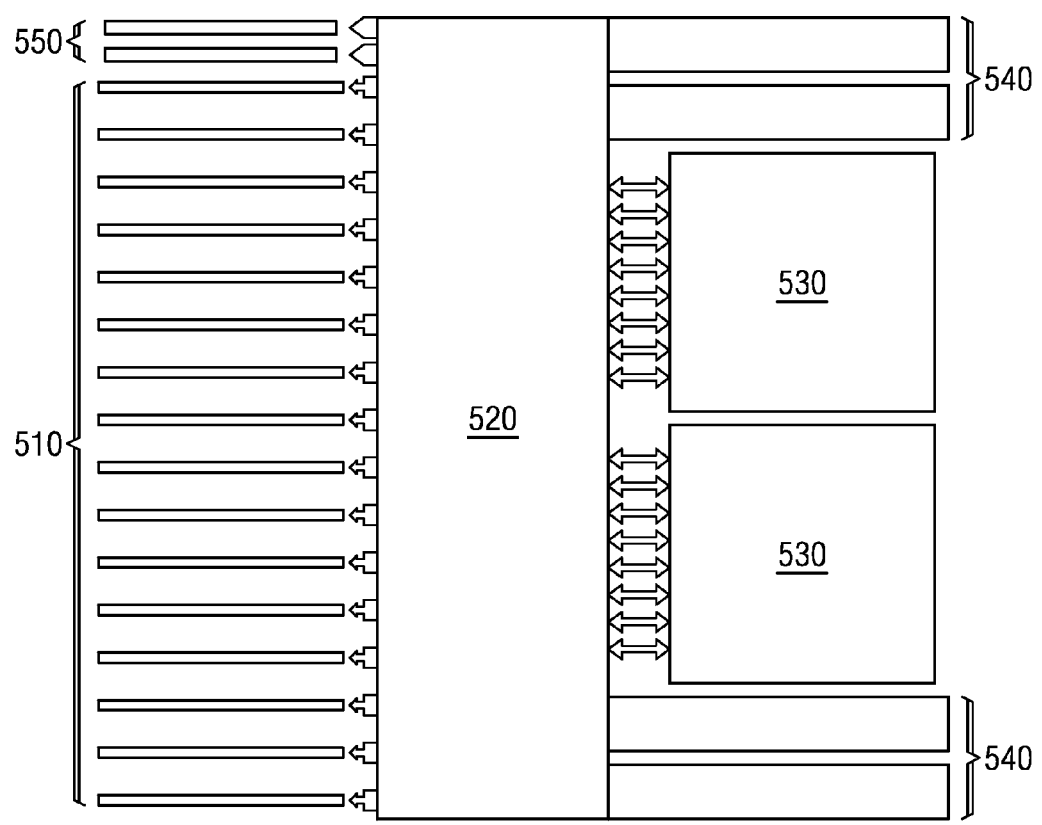

FIGS. 5A and 5B illustrate an alternative embodiment of an enclosure in which a plurality of port cards are coupled to a plurality of switch-fabric cards via a plurality of bridge cards, in accordance with particular embodiments. Within platform 500, port cards 510 may be arranged orthogonally to switch-fabric cards 530. This may allow one set of cards, such as port cards 510, to be mounted horizontally within platform 500 and the other set of cards, such as switch-fabric cards 530, to be mounted vertically within platform 500. Some embodiments may also include one or more power modules 540 operable to provide power to the one or more components of platform 500, while certain embodiments may additionally include one or more supervisor cards 550 operable to monitor one or more components of platform 500.

As in FIGS. 4A and 4B, bridge cards 520 may couple and/or interconnect port cards 510 and switch-fabric cards 530. Bridge cards 520 may effectively create a three dimensional midplane or backplane. In some embodiments, bridge cards 520 may be aligned with switch-fabric cards 530. In such embodiments, each bridge card 520 may be associated with any number of port cards 510 but only one switch-fabric card 530. Bridge cards 420 may be aligned with the direction of airflow (front to rear) and may maximize the openings for airflow through platform 400. Air can flow freely through the space between individual bridge cards 420. In some embodiments, bridge cards 420 may be physically shaped and placed so as to improve the flow of air through platform 400.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as 3-5, according to operational needs or desires.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims. For example, while the architectures depicted in FIGS. 4-5 show port cards and switch-fabric cards arranged in a vertical stack, in certain embodiments the port cards and the switch-fabric cards may be arranged with one in front of the other, or there may be multiple vertical stacks of port cards and/or switch-fabric cards.

What is claimed is:

1. A system, comprising:
    a plurality of port cards arranged along a first orientation, the port cards operable to receive data from one or more nodes on a network;
    a plurality of switch-fabric cards arranged along a second orientation orthogonal to the first orientation, the switch-fabric cards operable to route data between the one or more port cards based on one or more rules; and
    a plurality of bridge cards coupling the one or more port cards to the one or more switch-fabric cards, the bridge cards arranged along the second orientation and physically between the port cards and switch-fabric cards, each bridge card coplanar with at least one of the plurality of switch-fabric cards.

2. The system of claim 1, wherein the number of bridge cards is equal to the number of switch-fabric cards.

3. The system of claim 1, wherein the number of bridge cards is twice the number of switch-fabric cards.

4. The system of claim 1, wherein the port cards are arranged at a front end of an enclosure and the switch-fabric cards are arranged at a rear end of the enclosure.

5. The system of claim 1, wherein the switch-fabric cards arranged at a front end of an enclosure and the port cards are arranged at a rear end of the enclosure.

6. The system of claim 1, wherein the port cards, the switch-fabric cards, and the bridge cards are arranged to allow air to flow parallel to each of the port cards, the switch-fabric cards, and the bridge cards from a front end of an enclosure to a rear end of the enclosure.

7. The system of claim 1, further comprising one or more supervisor cards coupled to the bridge cards and arranged along the first orientation, the supervisor cards operable to monitor at least one of the port cards, bridge cards, and switch-fabric cards.

8. The system of claim 1, further comprising one or more power modules coupled to the bridge cards and arranged along the first orientation, the power modules operable to provide power to the port cards, bridge cards, and switch-fabric cards.

9. A system, comprising:
    a plurality of port cards arranged along a first orientation, the port cards operable to receive data from one or more nodes on a network;
    a plurality of switch-fabric cards arranged along a second orientation orthogonal to the first orientation, the switch-fabric cards operable to route data between the one or more port cards based on one or more rules; and
    a plurality of bridge cards coupling the one or more port cards to the one or more switch-fabric cards, the bridge cards arranged along the second orientation and having a first end and a second end, each bridge card coplanar with at least one of the plurality of switch-fabric cards;
    wherein a first portion of the port cards and a first portion of the switch-fabric cards couple to the bridge cards at the first end.

10. The system of claim 9, wherein a second portion of the switch-fabric cards couple to the bridge cards at the second end.

11. The system of claim 9, wherein a second portion of the port cards couple to the bridge cards at the second end.

12. The system of claim 9, wherein the number of bridge cards is equal to the number of switch-fabric cards.

13. The system of claim 9, wherein the number of bridge cards is twice the number of switch-fabric cards.

14. The system of claim 9, wherein the port cards and switch-fabric cards are arranged at a front end of an enclosure.

15. The system of claim 14, wherein the bridge cards are arranged at a rear end of the enclosure.

16. The system of claim 9, wherein the port cards, the switch-fabric cards, and the bridge cards are arranged to allow air to flow parallel to each of the port cards, the switch-fabric cards, and the bridge cards from a front end of an enclosure to a rear end of the enclosure.

17. The system of claim 9, further comprising one or more supervisor cards coupled to the bridge cards and arranged along the first orientation, the supervisor cards operable to monitor at least one of the port cards, bridge cards, and switch-fabric cards.

18. The system of claim 9, further comprising one or more power modules coupled to the bridge cards and arranged along the first orientation, the power modules operable to provide power to the port cards, bridge cards, and switch-fabric cards.

* * * * *